(12) United States Patent
Oxley

(10) Patent No.: US 6,539,694 B2
(45) Date of Patent: Apr. 1, 2003

(54) SELF-CLEANING MOWER

(75) Inventor: Lonnie Oxley, Versailles, KY (US)

(73) Assignee: Lonmore, L.C., Means, KY (US)

( * ) Notice: Subject to any disclaimer, the term of this patent is extended or adjusted under 35 U.S.C. 154(b) by 0 days.

(21) Appl. No.: 09/745,942

(22) Filed: Dec. 23, 2000

(65) Prior Publication Data

US 2001/0037632 A1 Nov. 8, 2001

Related U.S. Application Data

(63) Continuation-in-part of application No. 09/363,987, filed on Jul. 15, 1999, now Pat. No. 6,185,920.
(60) Provisional application No. 60/115,437, filed on Jan. 7, 1999, and provisional application No. 60/093,420, filed on Jul. 20, 1998.

(51) Int. Cl.[7] ............................................. A01D 34/73
(52) U.S. Cl. ......................................... 56/16.7; 56/12.7
(58) Field of Search ................................ 56/10.7, 10.6, 56/12.7, 13.6, 13.7, 17.4, 17.5, 16.7, 16.9, 255, 295, DIG. 17, DIG. 20; 30/276, 347

(56) References Cited

U.S. PATENT DOCUMENTS

| | | | |
|---|---|---|---|
| 3,396,518 A | 8/1968 | Johnson | 56/25.4 |
| 4,450,673 A | 5/1984 | Hutchison | 56/17.5 |
| 5,042,242 A | 8/1991 | Evans | 56/225 |
| 5,479,763 A * | 1/1996 | Coble | 56/12.7 |
| 5,483,790 A | 1/1996 | Kuhn et al. | 56/17.5 |
| 5,491,962 A * | 2/1996 | Sutliff et al. | 56/12.7 |
| 5,832,704 A * | 11/1998 | Routh | 56/13.4 |
| 5,907,947 A * | 6/1999 | Poole et al. | 56/12.7 |
| 6,301,863 B1 * | 10/2001 | Liebrecht | 56/10.6 |

* cited by examiner

Primary Examiner—Robert E. Pezzuto
(74) Attorney, Agent, or Firm—King & Schickli, PLLC

(57) ABSTRACT

A self-cleaning attachment for a rotary mower has a carrier member (26) supporting a flexible, linear element (25) radially spaced from the rotational axis of the blade at a level above the blade so the element rotates near the underside of the mower housing defining a narrow upper chamber where air pulses are concentrated to maintain the underside of the housing relatively clean of build-up. The carrier may have a plurality of elements in equally spaced relationship, the structure of which is such that the outer tips are supported above the blade when idle, and the inertial mass is low compared to the rotating mass of the blade such that there is relatively little rotational effect as the elements become worn. The attachment is retro-fittable to existing mowers without causing appreciable power loss or degrading the blade stopping capability below ANSI standards for residential lawn mowers.

45 Claims, 6 Drawing Sheets

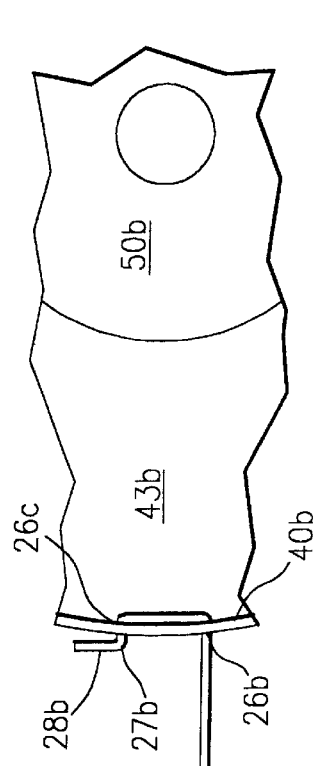
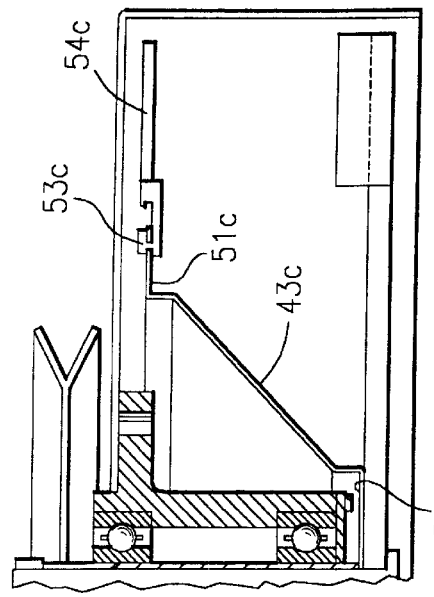
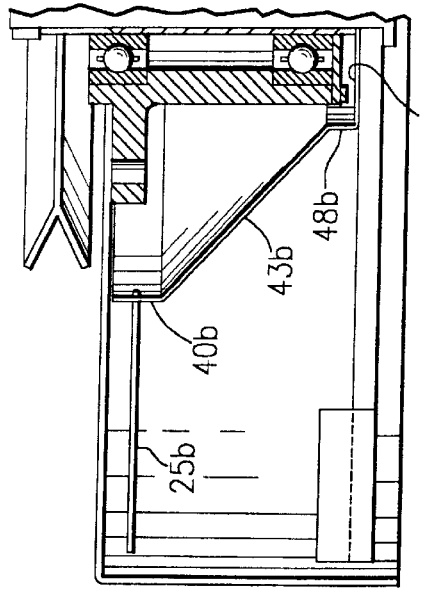
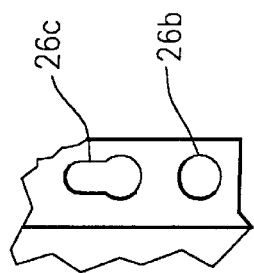

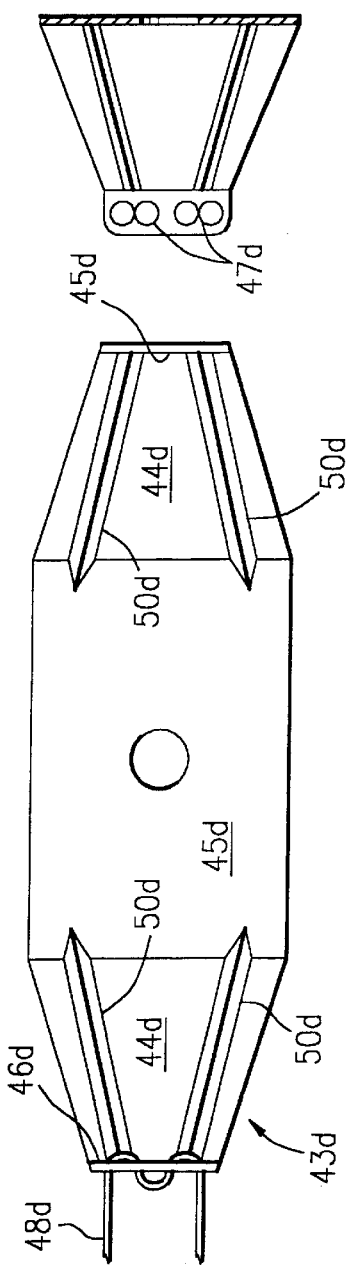
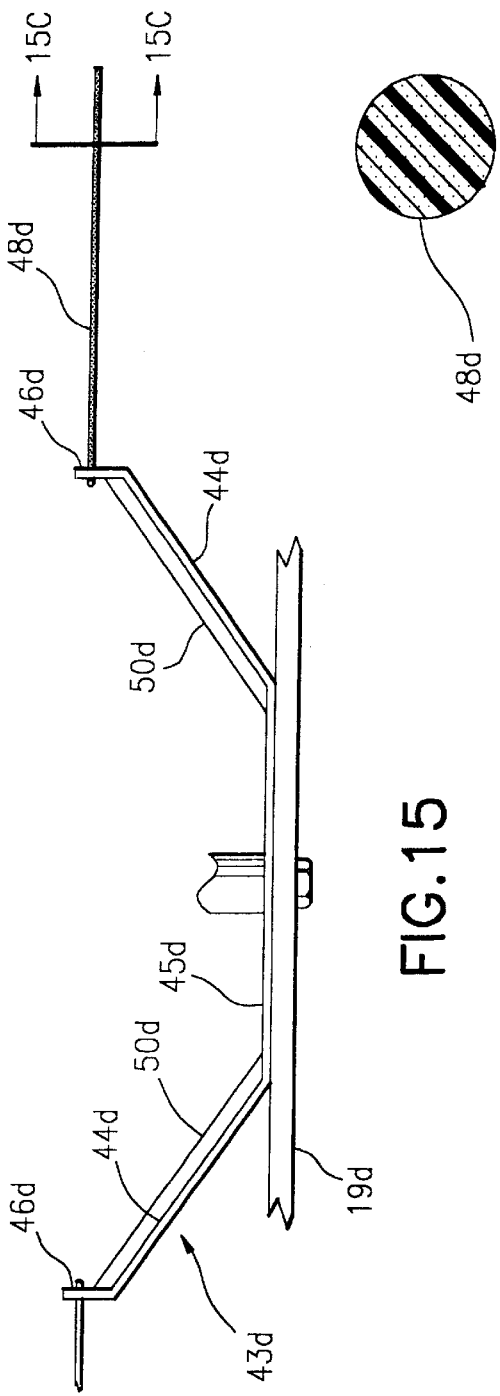

SELF-CLEANING MOWER

PRIOR PATENT APPLICATIONS

This application and invention is a continuation-in-part of a U.S. patent application entitled Zero Radius Steering, Compact, Stand-On Mower and Utility Tractor, filed Jul. 15, 1999, Ser. No. 09/363,987, now U.S. Pat. No. 6,185,920, a provisional application filed Jan. 7, 1999, Ser. No. 60/115,437, and a provisional application filed Jul. 20, 1998, Ser. No. 60/093,420.

FIELD OF THE INVENTION

This invention pertains to rotary mowers, primarily for grass cutting and lawn maintenance where the grass clippings are re-cut or mulched by a high speed rotating blade inside of a housing or a deck that must be kept reasonably clear of grass build-up on the underside for efficient cutting.

BACKGROUND OF THE INVENTION

Mowers have been proposed with scrapers that rotate on the same shaft as the cutting blade underneath the housing for keeping the grass cleaned off. For example, U.S. Pat. No. 3,396,518 issued Aug. 13, 1968 shows a scraper revolving by friction on an eccentric bearing about the motor shaft. However the scraper is not positively driven, and the underside of the housing must be flat. Grass build-up overpowers the scraper, so a hole is provided to manually free it up. Power rotating the scraper would be impractical. Its eccentric motion would unbalance the mower causing excessive vibration. Also, its rotary inertia would be too high for conventional blade stopping or braking systems. The stopping requirements of safety regulations, e.g., the American National Standards Institute (ANSI) for outdoor power equipment require stopping a blade from full rotation within a few seconds from maximum rpm for residential use. For a high inertia blade this becomes difficult for the available braking mechanisms on such mowers, ruling out any possibility of putting a self-cleaning device with high inertial mass on existing mowers.

Another attempt to solve the build up problem is disclosed in U.S. Pat. No. 4,450,673 issued May 29, 1984. There a counter rotating housing driven by belts rotates in an opposite direction to the main blade, and it also carries auxiliary blades for re-cutting the grass clippings, with the object of keeping the underside reasonably free of build-up. This arrangement suffers from more difficulties than the rotating scraper design described above. A spinning mass as large as the counter rotating housing in this disclosure would simply overwhelm a conventional braking systems making it impossible to comply with ANSI standards.

Another attempt to solve the build-up problem is shown in U.S. Pat. No. 5,042,242 issued Aug. 27, 1991. Here a hub rotates with the blade and has a radial flange above the blade. The flange has opposed lugs from which pivot lengths of chain. Theses are supposed to act as blowers when the grass is dry to help keep the underneath of the housing clear. In wet grass, the chains are replaced with blades sharpened in the direction of rotation. Wet grass is re-cut to a finer state for supposedly to help prevent build-up, however, whether chains or blades, they are not self-supporting, and would drop or hinge from the flange when the blade rotation stops. Also, they would get tangled in the blade when starting. Both must be balanced to prevent vibration and noise. The rotating masses of the chains or blades would be too much for existing braking systems, and could not be deployed on existing mowers. Power consumption also would be a problem. The horse power of existing mowers would be over taxed driving the main cutting blade and these rotating masses too. Thus, these devices if sold for use with existing mowers would be impractical. Not only would the mower have trouble starting, but at operating speed the power drained off by the excess mass would cause the engine to lug down in heavy grass or vegetation.

Still another patent (U.S. Pat. No. 5,483,790 issued Jan. 16, 1996) discloses a revolving disk and mulching blade in a torsional air flow chamber where curved baffles or a double walled inner housing are situated to deflect the clippings back into the blade for re-cutting before discharge from the rear of a deck. This arrangement is not cost effective, and is also flawed as a self-cleaning system since the grass buildup is not prevented in the most sever regions, near the outer periphery of the housing, and efficient removal is limited to the inner circumference of the torsional air chamber. Moreover, the high speed rotating disk only adds more mass to the motor shaft making it difficult to stop within the ANSI standards.

My present invention goes in a different direction than the prior art in solving the grass build-up problem.

SUMMARY OF THE PRESENT INVENTION

My prior patent application, Ser. No. 07/679,567, filed Apr. 2, 1991, now abandoned, is incorporated herein as if set forth in full, and discloses low mass, linear elements that rotate above the motor driven blade near the underside of the housing. The low mass elements generate air pulses of a high frequency proportional to the rpms of the rotating shaft that beats and disperses the grass clippings into a finer state than as cut by blade. They are re-circulated or mulched further by the blade, and conveyed either into a discharge chute or distributed on the ground. The combination of physical attack and high frequency air pulses largely prevents the grass particles from adhering to the underside of the housing. The elements have enhanced aerodynamic power due to the close proximity to the housing, but also where obstructions, such as bolts or curved baffles exist inside the housing, the high velocity air pulses, and eddies, impact against theses obstructions too, or any other irregular surfaces, to maintain the housing relatively clean. The cleaning action is especially powerful toward the periphery of the elements where the angular velocities are greatest. The air borne particles are aerodynamically pulsed the more violently within the housing at the place where accumulations tend to be greatest. The underside of the housing together with the high velocity elements tend to form an upper chamber where the clippings are beat into fine particles more easily conveyed out by the turbulent pressure head created by the blade out of the housing.

This upper chamber of high velocity pulses is complemented by a lower chamber defined between the mower blade and the elements creating a recirculating air flow. In this chamber the rotating tips of the blade and the linear elements produce air turbulence of a recirculating, toroidal pattern. Blade geometry in mulching mowers produces violent updrafts, particularly at the tips, where a high pressure head exists while nearer the shaft, at lower angular velocities, a lower pressure head exists forcing the grass particles to move in a toroidal circular pattern. The flexible, linear elements extend as far as the tips of the blade to augment the recirculation and cutting action.

Moreover, the turbulent air flow pattern in the lower chamber is increased in part due to the elements cooperating with the blade, and the lower drag from having very little accumulation of grass cuttings under the housing, all of which helps create a uniform discharge at higher pressure head. The finely divided grass particles are conveyed as a fluidized stream so dispersed as to reduce wind rowing or where an attachment for collection or bagging is being used, to facilitate this operation.

Where the self-cleaning system of the invention is employed with multiple blade mowers, the linear elements cooperate with each blade, and the interior housing surfaces to cause turbulent flow of the grass particles into a discharge opening, or where bagging, to force feed the bag.

In one embodiment, the low mass, flexible string elements are spring steel, like music wire. Others are polymer string filaments. Nylon strings may have an abrasive imbedded in them for greater life. Other elements may be durable, flexible plastic linear members with a metal cutting edge sharpened in the direction of rotation for durability. Or they may be aerodynamically shaped in cross section to produce more up draft, if convex on the upper side, or down draft, if the shape is reversed to minimize power consumption. Where the elements are flexible filaments, or more stiff linear elements that hinge at their base, the centrifugal force causes them to become essentially rigid.

An important difference of the invention and prior art systems is that the rotating mass of my self-cleaning system is slight as compared to the rotating mass of the blade. The mower is easier to start, and during operation, the mass of the elements is insignificant in terms of the inertia of the entire rotating mass. Where one linear element is employed, it is too light to unbalance the mower shaft, or cause objectionable noise and vibration, and where they are employed in opposed pairs, the natural balance is not upset by wear or breaking away of a single element.

Another important difference is the self-supporting feature of the flexible elements. Where the base is secured to a rotating hub, the radius of the hub is approximately half that of the blade leaving a shorter radial length for the elements than heretofore has been employed so the flexible material is self-supported, and doesn't drag or drop into the blade when stopped. Where the elements are rigid members attached to the hub, hinging at the base is prevented by a mechanical engagement with the hub but easily disconnected if needed to replace an element.

The flexible elements extend radially out from a hub or carrier. In one embodiment this is a disk rotating above the blade. In another it is a base with opposed tapered wings angled upwardly near the underside of the housing. In any case, the carrier is symmetrical with the rotating axis and positions the elements in a plane near the underside of the housing. The base holds the inner ends of the flexible elements fixed firmly against the pulling action of the centrifugal force. For the self-supporting elements the centrifugal force has little effect in extending them out to full extension since the tips are already self supported spaced above the tips of the blade, i.e., the tips are at the same radial distance from the axis of rotation as the ends of the blade. The housing has a relatively flat undersurface which defines, with the base and rotating elements, an annular upper chamber. This chamber, due to the high position of the elements on the shaft, is narrow, preferably not more than about a half inch wide. The low mass inertia of the elements relative to the blade makes it unnecessary to perform balancing operations, and the need to replace an element that is broken is usually evident only by periodic inspection.

In one embodiment, an assembly with a lower wall is provided in which a hole is centrally located for mounting it on the blade shaft and having an upper portion to which the linear elements are adapted to mount, the assembly being sold as a self-cleaning retro-fit package for existing mowers that were not designed for self-cleaning as manufactured. The elements are housed entirely by the mower deck and cannot cause injury or damage. The existing braking systems for stopping blade rotation within ANSI standards will still be effective with my self-cleaning retro-fit package since no appreciable rotating mass is added.

A primary object is to provide a low mass, linear element spaced above the mower blade and near the undersurface of the housing of a length from its anchor on the inner end to its outer tip that is proportional to the blade radius adapted to rotate at blade speed to create high velocity air pulses in a chamber defined by the rotating element above the blade and below the housing.

Another object is to provide a self-cleaning retro-fit package that is adapted to be assembled with an existing rotary mower without violating ANSI standards for safety in blade stopping requirements.

The self-supporting feature allows use with blades up to 24 inches in diameter without the elements hinging or dangling down into the blade when stopped or getting tangled on start up.

The flexible, light weight nature of the design improves the economy of manufacture, minimizes any damage to components or due to overloading, and reduces impact forces to the elements or mower itself in operation.

If the conditions are such that build-up occurs in the operating area of the elements, or they become worn from excessive use, mowing can continue with the conventional mulching not being interfered with.

Another object is to provide a self-cleaning mower that discharges more uniformly or when bagging the grass clippings, a turbulent pressure head is created to forcefully discharge clippings into a bagging system while keeping the underside of the deck relatively clean. Advantageously, this is achieved under substantially any foreseeable operating conditions of the grass, wet or dry.

These and other objects of the invention will become more apparent by referring to the following detailed description of a preferred embodiment of the invention.

DESCRIPTION OF THE DRAWINGS

FIGS. 8 and 8A show partial cross sections of two different carrier designs and linear elements;

FIGS. 9, 9A and 10 show in partial views the carrier in FIG. 8 with different mounting arrangements for linear elements, FIGS. 15, 15A–C illustrate a modification of the carrier with a polymer filament impregnated with abrasives.

The invention is more fully described below using the illustrations in the accompanying drawings.

DETAILED DESCRIPTION OF THE INVENTION

Figure 4:
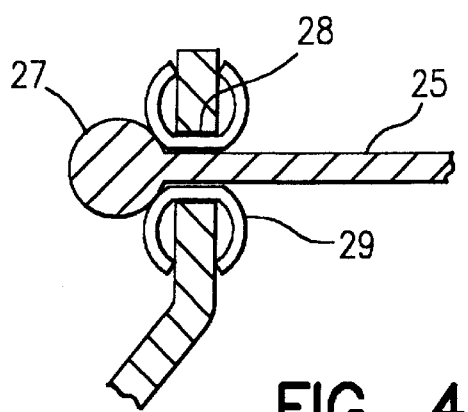
FIGS. 4 and 5 show variations for mounting the linear elements.

A mower 12 has a housing in which a blade 19 is mounted on a shaft which is driven by a belt and pulley in a conventional manner. A low mass, linear element 25 is mounted above the blade at its inner end on a carrier, or disk, 26 spinning with the blade shaft. The element 25 is flexible and very light weight, such as a polymer filament, like nylon, or a thin, steel wire, or other durable linear material, more or less self supporting in the length employed, about half the radius of the blade 19 and becoming more rigid at the high angular velocity of the blade. A plurality of filaments may be mounted on the disk in radially opposed relationship. The inner ends of the filaments 25 have a bead 27 which prevents the filaments from being pulled through a rim of the disc 26, which has a hole 28, in which a grommet 29 (FIG. 4) is inserted to hold and cushion the end of the filaments keeping the centrifugal force from pulling the filament through the hole 28. Or, the filaments may have a grove 30 and rib 31 in front of the bead 27 cooperating with a punched aperture 32 deformed inwardly which engages a spherical portion of the bead 27 (FIG. 5) to more securely hold the filament, or filaments, against being pulled out by the dynamic forces of rotation.

Figure 2:
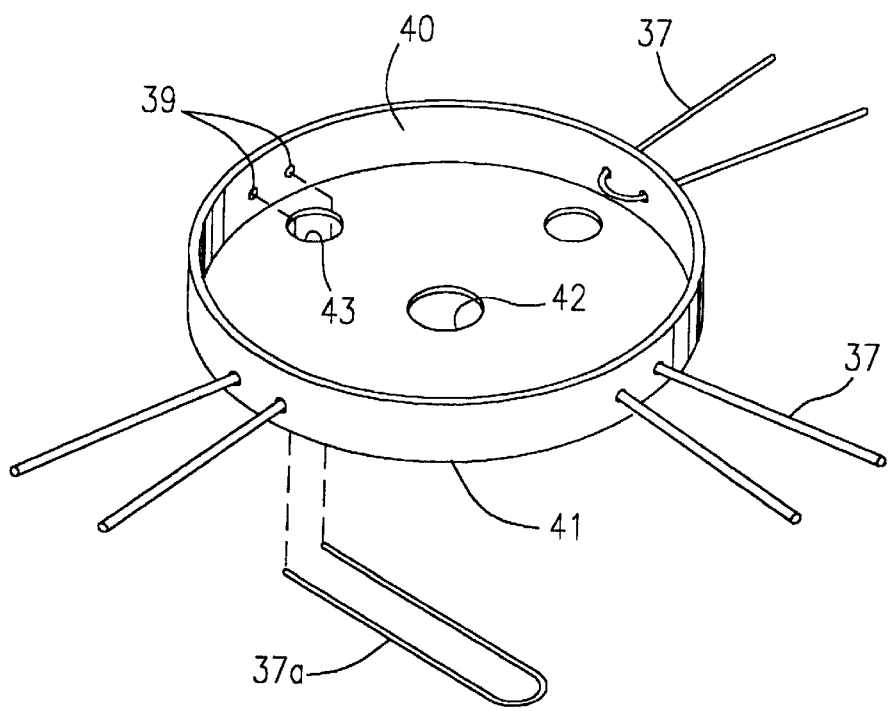
FIG. 2 is a version of carrier disk where U-shaped wires are the low mass linear elements.

Another low inertia carrier and linear element is shown in FIG. 2. Here the elements 37 are U-shaped wires, the leg portions of which extend through a pair of holes 39 in a rim 40 of a carrier hub 41 in which a center hole 42 is provided for the blade shaft. Openings 43 in the bottom are provided for changing a worn or broken element with a replacement 37(a).

Figure 3:
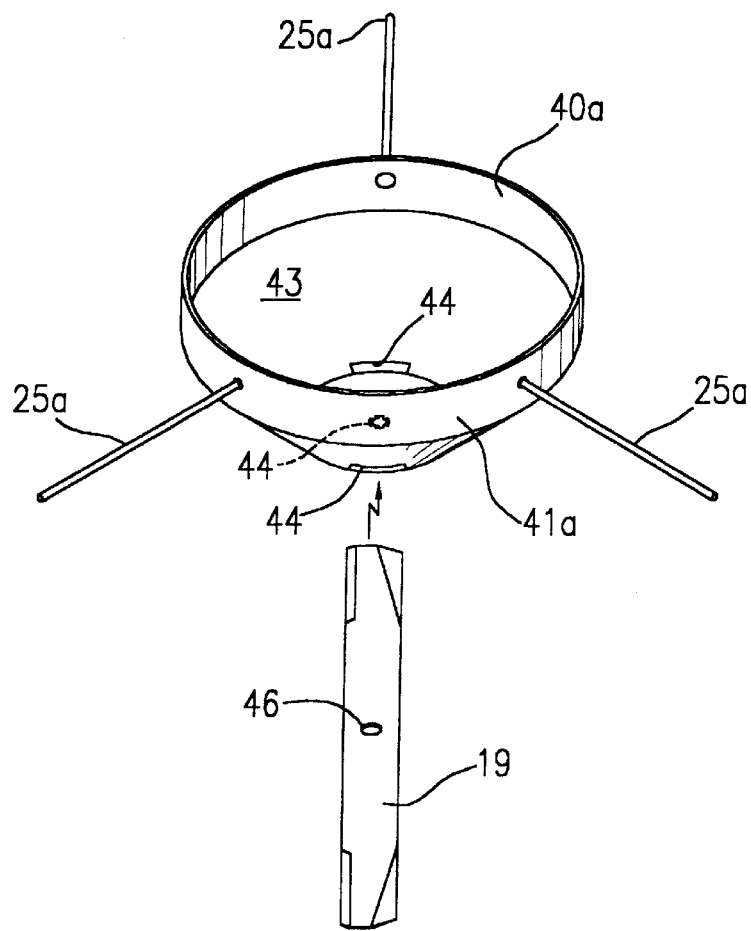
FIG. 3 is another form of disk in the shape of a frusto-conical carrier.
Figure 5:
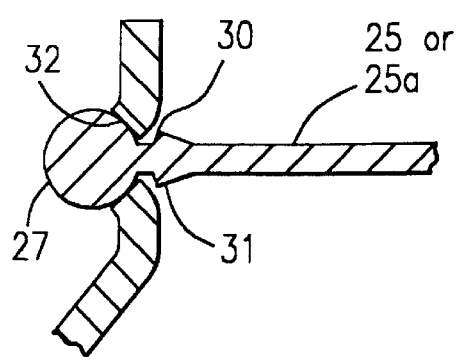

A carrier modification is shown in FIG. 3. Instead of a disk or hub carrier, a frusto-conical bowl has a rim 41(a) in which wires 25(a) are secured at their inner ends, as for example as depicted in FIG. 5, however, in this variation the rim 41(a) is joined by a frusto-conical portion 43 which has side slots 44 through which the blade (19) is inserted which help lock the blade against relative rotation on the shaft. The shaft extends through a mounting hole 46 in the center of the blade, when positioned in the middle of the carrier above a mounting hole 47 in the bottom wall.

Figure 7:
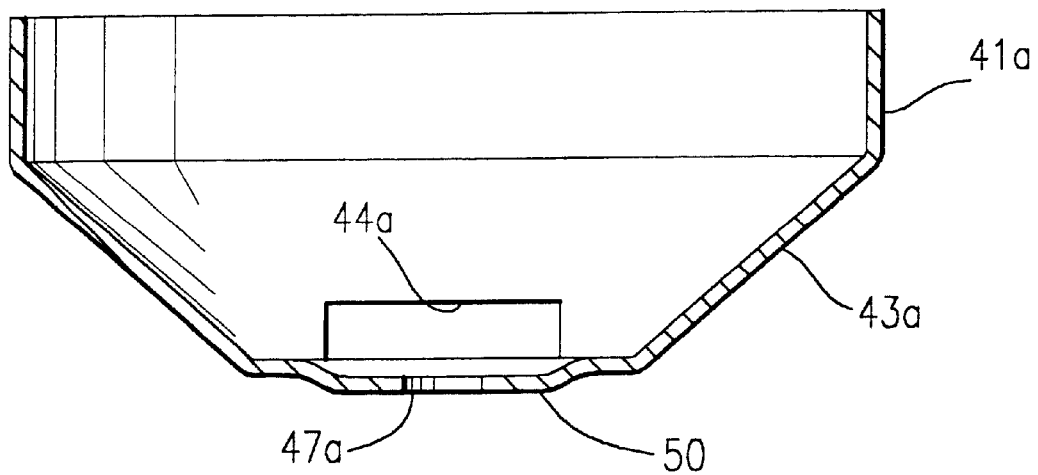
FIG. 7 shows another carrier.

A modification (FIG. 7) has a depression 50 around a hole 47(a) in the bottom wall of the frust-conical bowl. This provides a lock washer effect as the depression 50 deflects when tightening the nut on the shaft helping to secure the blade against relative rotation.

Figure 6:
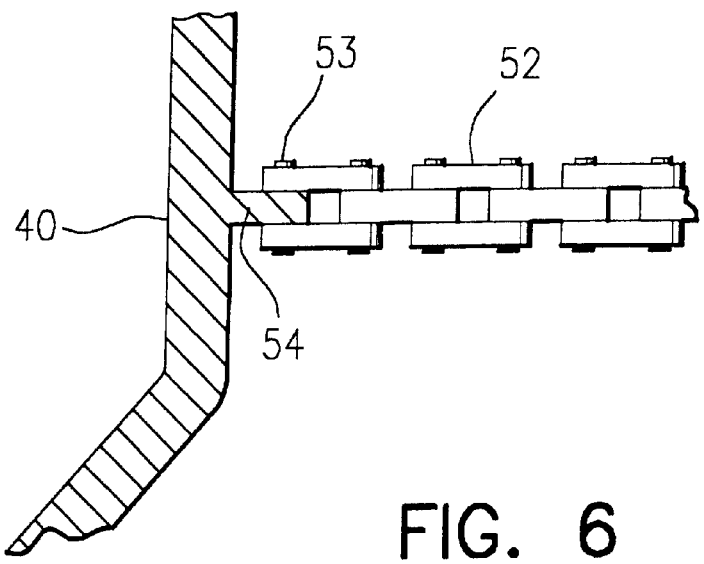
FIG. 6 shows a different mounting and linear element (bicycle chain)

A self-supporting linear element of a different type is shown in FIG. 6. Here the periphery of the carrier has a plurality of opposed link chains 52 mounted with the pivots between links vertical. The chains are prevented from pivoting down into the blade when the mower is stopped, or getting tangled up in the blade when starting. A pin at 53 secured the inner ends to an eye 54 on the periphery 40(a) of the carrier.

In FIGS. 8 and 8A, a mower housing is split along the shaft axis with one version of carrier depicted in FIG. 8 and an alternate version in FIG. 8A. Both are adapted for retro-fitting on existing mowers by merely unbolting the blade and mounting a rotatable hub about the shaft. In each embodiment, a frusto conical or frusto pyramidal bowl 43(b) revolves with the blade shaft. In FIG. 8 a rim 40(b) is connected to a frusto conical side wall 43(b) joined at the lower end by a vertical flange 48(b) and then to a bottom wall 50(b) firmly held against the blade 19(b) so the flange 48(b) reduces wrapping about the shaft uncut vegetation or the like. As shown in partial plan view in FIG. 9, and in broken away side view in FIG. 10, the rim 40(b) has a pair of holes, 26(b) (c), to receive an element 25(b) with a dog leg 27(b) inserted in hole 26(c) which is slotted to allow ease of assembly and replacement. After insertion, the end 28(b) of the dog leg may be bent down. This assures that the linear element 25(b) is self-supporting since the bent down end acts as a stop against hinging at the rim. Also, the arrangement facilitates servicing of the elements 25(b) which may be individually removed to replace a broken element without having to also remove the bowl.

Figure 11:
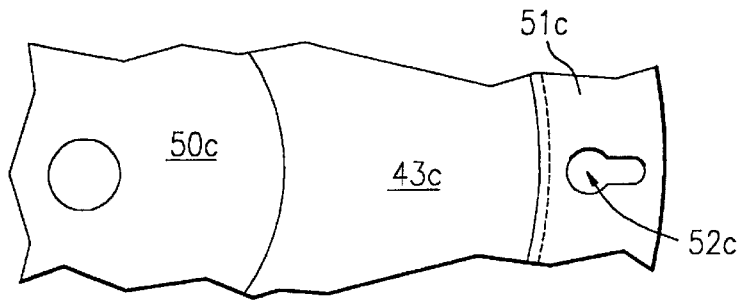
FIGS. 11, 12, 13A, 13B, 14, 14A–D show a partial broken view of the carrier in FIG. 8A with various views of linear elements having different shapes.
Figure 12:
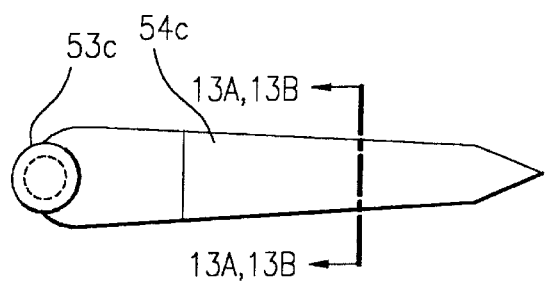
Figures 13A, 13B:
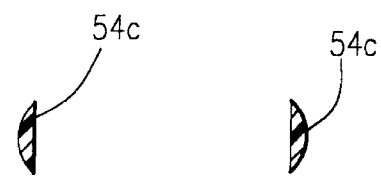
Figure 14A:
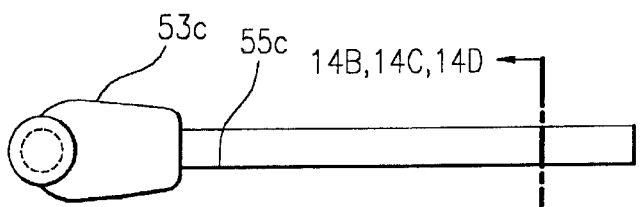
Figures 14B, 14C, 14D:
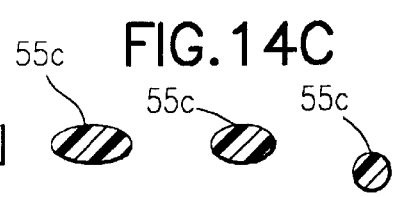
Figure 14:
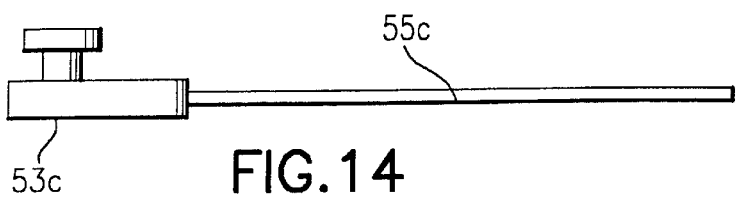

In FIG. 8A, another version of carrier is shown where the rim has a radial flange 51(c) projecting from the frusto-conical side wall 43(c) as shown in partial fragmented plan view in FIG. 11. A key slot 52(c) is adapted to receive a lug 53(c) with a narrow portion toward the periphery of the rim 51(c) so that centrifugal force will seat the lug 53(c) upon rotation. A rigid, hard, polymer blade or cleaning element 54(c) secured to lug 53(c) may have a convex cross section (FIG. 13A) facing upwardly for updraft, or downwardly (FIG. 13B) for downdraft and the edges of the blades may have metal inserts for longer life. In FIGS. 14–14A, a semi-rigid blade or cleaning element 55(c) is shown secured to the lugs 53(c). The blade may have one of several cross sections as depicted in FIGS. 14B, C, & D, from aerodynamic oval, ellipse, or circular, respectively.

Another carrier is shown in FIGS. 15, 15A, B. Here the bowl shape is replaced with a plate having a base 45(d) rectangular in shape with a center hole for the shaft through the blade 19(d) of a conventional push mower originally manufactured without a self cleaning system and being retro-fitted with the invention. A pair of opposed wings 44(d) extend upwardly at an angle from the base 45(d), each having a lip 46(d) in which a series of four holes 47(d) in a line is positioned to receive a flexible filament 48(d) woven between the holes in a "w" pattern. This prevents the filaments from working out under high speed rotation. The wings 44(d) are tapered to minimize build-up on the. edges. Stiffening ribs 50(d) hold the wings rigid at the desired angle positioning the filaments near the underside of the housing, preferably within an inch, or as close as the underside obstructions will permit without interference with the tips of the filaments.

The pair of lips 46(d) are spaced from the center of rotation about half the radius of the blade 19(d). The filaments are stiff enough to be self supporting at this length. The filaments may be a durable, tough plastic which is impregnated with an abrasive to prolong its life as depicted in cross section by stippling in FIG. 15C. While FIG. 15 shows one variation for retro-fitting an existing mower, the attachment may take various other forms depending on the blade structure and shaft mounting for the blade. The blade may have a single mounting hole, directly on the shaft, as illustrated here, or a pilot hole, with spaced bolts threading into a hub on the shaft, or the blade itself may be made a part of the carrier with holes radially spaced from the shaft centerline to which a bracket is mounted, or a ring, similar to the carrier 41 in FIG. 2, is bolted and instead of a bottom wall, the carrier would become an annular ring with a bottom flange having mounting holes aligned with those of the blade.

A vertical leg, or rim, like the rim 40 in FIG. 2, would extend upwardly near the underside of the deck for mounting a plurality of linear elements. Or separate blade elements may be in opposed relationship on a shaft hub having a radial dimension wide enough to position a carrier bracket, similar to the plate in FIG. 15, out far enough for mounting the elements at the proper radial distance from the shaft. However, in each of these embodiments, the underlying principle is to provide low inertial mass rotating just below the underneath of the housing, or as close thereto as bolts and interior baffles will permit. Whether nylon strings, music wire, rigid, or semi-rigid blades, bicycle chain, or other light weight linear elements is immaterial if the result is a significant increase in air pulses from the self-supporting elements. They are self supporting and do not tangle up in the blade or dangle down when the mower is stopped.

Figure 1:
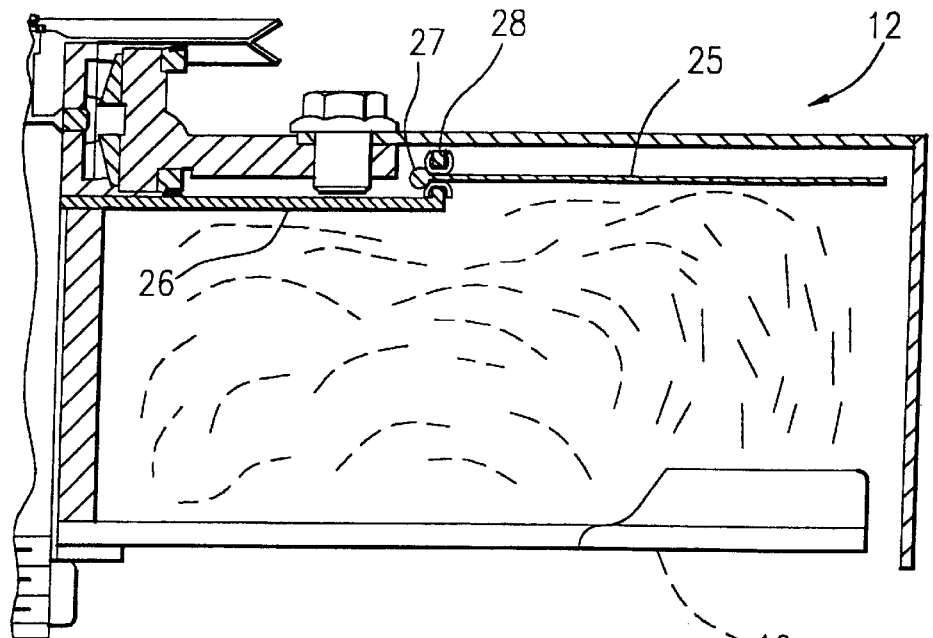
FIG. 1 is a partial cross-sectional view through the mower housing or deck.

Especially important, the rotating assembly is retro-fittable on existing mowers since the power consumption is negligible and blade braking systems are capable of stopping the self-cleaning assembly within ANSI requirements, in less than 5 seconds for residential mowers. Also, the low mass of the elements avoids the tendency for unbalancing the system at the high angular velocities employed while cutting grass. The low inertia elements do several things in addition to mulching the grass more finely, as depicted in FIG. 1, for they also create aerodynamic pulses in an upper chamber formed just below the housing and above the elements forming a turbulent fluidized mixture flowing under pressure toward the discharge opening from the deck. Within the upper chamber, the air pulses help prevent a build-up of grass residue under the housing and reduce power consumption. This also enhances the air discharge, which improves the cutting quality. A turbulent, toroidal air circulation is created in the lower chamber which causes the grass clippings to be re-circulated and brought into contact numerous times with the violently rotating elements and blade.

The additional cutting surfaces improve the mulching, and enhance the pressure differential under the housing between the upper and lower chambers so the grass particles are conveyed more efficiently either for uniform distribution on the ground or to be bagged. In addition, the elements being located close to the underside of the housing physically clear off any build-up of wet grass residue adhering to the underside. Various alternatives have been illustrated with respect to carrying out the functions of the of the invention and it will be appreciated that reasonable equivalents may be used without departing from the scope of the invention as set forth in the appended claims.

I claim:

1. A self-cleaning attachment for a lawn mower including a housing, a motor, an output shaft, and a rotary cutting blade, comprising:
    a rotary carrier powered by said output shaft, said rotary carrier including at least one key slot; and
    a cleaning element including a lug at one end secured in said key slot;
    wherein said cleaning element is supported at one end by the carrier to extend radially and non-vertically, substantially from a midpoint of a radius of a circle described by said rotary cutting blade when rotated, and said cleaning element is substantially self-supporting along its length such that the element does not contact the cutting blade when the rotary carrier is at rest.

2. The self-cleaning attachment of claim 1, wherein said cleaning element is a semi-rigid blade.

3. The self-cleaning attachment of claim 2, wherein said blade has a cross-section selected from a group of shapes consisting of oval, elliptical, circular and any mixtures thereof.

4. The self-cleaning attachment of claim 1, wherein said key slot includes a first relatively wide portion communicating with a second, relatively narrow portion.

5. The self-cleaning attachment of claim 4, wherein said second relatively narrow portion is oriented toward a periphery of said rotary carrier.

6. The self-cleaning attachment of claim 5, wherein said lug includes a relatively narrow intermediate portion and two relatively wide outer portions, said relatively narrow intermediate portion being sized for receipt in said second relatively narrow portion of said key slot.

7. The self-cleaning attachment of claim 6, wherein said relatively narrow intermediate portion is round in cross-section to function as a pivot point for said cleaning element.

8. The self-cleaning attachment of claim 1, wherein said cleaning element is a rigid, hard polymer blade.

9. The self-cleaning attachment of claim 8, wherein said blade has a convex cross section.

10. The self-cleaning attachment of claim 8, wherein said blade includes metal inserts along at least one edge.

11. The self-cleaning attachment of claim 1, further including a plurality of key slots radially arranged about said rotary carrier and a plurality of cleaning elements, one cleaning element mounted in each of said plurality of key slots.

12. The self-cleaning attachment of claim 1, wherein said cleaning element extends radially from said rotary carrier to substantially the length of said cutting blade and in a substantially parallel plane to said cutting blade.

13. A lawn mower, comprising:
    a housing including a blade cavity;
    a motor carried on said housing and having an output shaft;
    a rotary cutting blade received in said blade cavity and powered by said output shaft;
    a rotary carrier received in said blade cavity and powered by said output shaft, said rotary carrier including at least one opening;
    at least one flexible filament mounted for rotation with said rotary carrier, wherein the filament is supported at one end by the carrier to extend radially and non-vertically, substantially from a midpoint of a radius of a circle described by said rotary cutting blade when rotated;
    said at least one flexible filament being substantially self-supporting along its length such that the filament does not contact the cutting blade when the carrier is at rest, and having a bead on one end to retain said at least one filament in said at least one opening.

14. The lawn mower of claim 13, wherein said at least one filament is a nylon string.

15. The lawn mower of claim 13, wherein said rotary carrier comprises a hub having a conical portion extending axially downward to said cutting blade, said conical portion including an output shaft opening and a pair of opposed blade mounting openings through which said rotary cutting blade is inserted.

16. The lawn mower of claim 14, wherein said conical portion has a deformation around said output shaft opening that is compressed when said rotary cutting blade is secured onto said shaft.

17. The lawn mower of claim 13, wherein said rotary carrier comprises a hub having an annular flange and said at least one opening is formed in said annular flange.

18. The lawn mower of claim 13, wherein said at least one flexible filament extends radially from said rotary carrier to substantially the length of said cutting blade and in a substantially parallel plane to said cutting blade.

19. A lawn mower, comprising:

a housing including a blade cavity;

a motor carried on said housing and having an output shaft;

a rotary cutting blade received in said blade cavity and powered by said output shaft;

a rotary carrier received in said blade cavity and powered by said output shaft, said rotary carrier having a bottom wall, an annular flange and at least two openings formed in said annular flange; and at least one flexible, U-shaped filament held in said at least two openings;

wherein said U-shaped filament is supported at one end by the carrier to extend radially and non-vertically, substantially from a midpoint of a radius of a circle described by said rotary cutting blade when rotated, and said filament is substantially self-supporting along its length such that the filament does not contact the cutting blade when the rotary carrier is at rest.

20. The lawn mower of claim 19, wherein said rotary carrier further includes an access hole in said bottom wall adjacent said annular flange to allow access for removably inserting a new flexible U-shaped filament when an old flexible U-shaped filament needs replacement.

21. The lawn mower of claim 19, wherein said at least one flexible, U-shaped filament extends radially from said rotary carrier to substantially the length of said cutting blade and in a substantially parallel plane to said cutting blade.

22. A lawn mower, comprising:

a housing including a blade cavity;

a motor carried on said housing and having an output shaft;

a rotary cutting blade received in said blade cavity and powered by said output shaft;

a rotary carrier received in said blade cavity and powered by said output shaft, said rotary carrier including at least one key slot; and a cleaning element including a lug at one end secured in said key slot;

wherein said cleaning element is supported at one end by the carrier to extend radially and non-vertically, substantially from a midpoint of a radius of a circle described by said rotary cutting blade when rotated, and said cleaning element is substantially self-supporting along its length such that the cleaning element does not contact the cutting blade when the rotary carrier is at rest.

23. The lawn mower of claim 22, wherein said key slot includes a first relatively wide portion communicating with a second, relatively narrow portion.

24. The lawn mower of claim 23, wherein said second relatively narrow portion is oriented toward a periphery of said rotary carrier.

25. The lawn mower of claim 24, wherein said lug includes a relatively narrow intermediate portion and two relatively wide outer portions, said relatively narrow intermediate portion being sized for receipt in said second relatively narrow portion of said key slot.

26. The lawn mower of claim 25, wherein said relatively narrow intermediate portion is round in cross-section to function as a pivot point for said cleaning element.

27. The lawn mower of claim 22, further including a plurality of key slots radially arranged about said rotary carrier and a plurality of cleaning elements, one cleaning element mounted in each of said plurality of key slots.

28. The lawn mower of claim 22, wherein said cleaning element is a rigid, hard polymer blade.

29. The lawn mower of claim 28, wherein said blade has a convex cross section.

30. The lawn mower of claim 28, wherein said blade includes metal inserts along at least one edge.

31. The lawn mower of claim 22, wherein said cleaning element is a semi-rigid blade.

32. The lawn mower of claim 31, wherein said blade has a cross-section selected from a group of shapes consisting of oval, elliptical, circular and any mixtures thereof.

33. The lawn mower of claim 22, wherein said cleaning element extends radially from said rotary carrier to substantially the length of said cutting blade and in a substantially parallel plane to said cutting blade.

34. A lawn mower, comprising:

a housing including a blade cavity;

a motor carried on said housing and having an output shaft;

a rotary cutting blade received in said blade cavity and powered by said output shaft;

a rotary carrier received in said blade cavity and powered by said output shaft; and a cleaning element having a substantially w-shape secured to said rotary carrier;

wherein said w-shaped cleaning element is supported at one end by the carrier to extend radially and non-vertically, substantially from a midpoint of a radius of a circle described by said rotary cutting blade when rotated, and said cleaning element is substantially self-supporting along its length such that the cleaning element does not contact the cutting blade when the rotary carrier is at rest.

35. The lawn mower of claim 34, wherein said w-shaped cleaning element extends radially from said rotary carrier to substantially the length of said cutting blade and in a substantially parallel plane to said cutting blade.

36. A self-cleaning attachment for a lawn mower including a housing, a motor, an output shaft, and a rotary cutting blade, comprising:

a rotary carrier powered by said output shaft, said rotary carrier including a bottom wall, an annular flange and at least two openings formed in said annular flange, and at least one flexible, U-shaped filament held in said at least two openings;

wherein said U-shaped filament is supported at one end by the carrier to extend radially and non-vertically, substantially from a midpoint of a radius of a circle described by said rotary cutting blade when rotated, and said filament is substantially self-supporting along its length such that the filament does not contact the cutting blade when the rotary carrier is at rest.

37. The self-cleaning attachment of claim 36, wherein said flexible, U-shaped filament extends radially from said rotary carrier to substantially the length of said cutting blade and in a substantially parallel plane to said cutting blade.

38. A self-cleaning attachment for a lawn mower including a housing, a motor, an output shaft, and a rotary cutting blade, comprising:

a rotary carrier powered by said output shaft; and at least one roller chain connected to said rotary carrier;

wherein said roller chain is supported at one end by the carrier to extend radially and non-vertically, substantially from a midpoint of a radius of a circle described by said rotary cutting blade when rotated, and said roller chain is substantially self-supporting along its length such that the chain does not contact the cutting blade when the rotary carrier is at rest.

39. The self-cleaning attachment of claim 38, wherein said roller chain extends radially from said rotary carrier to substantially the length of said cutting blade and in a substantially parallel plane to said cutting blade.

40. A lawn mower, comprising:
   a housing including a blade cavity;
   a motor carried on said housing and having an output shaft;
   a rotary cutting blade received in said blade cavity and powered by said output shaft;
   a rotary carrier received in said blade cavity and powered by said output shaft; and
   at least one roller chain connected to said rotary carrier;
   wherein said roller chain is supported at one end by the carrier to extend radially and non-vertically, substantially from a midpoint of a radius of a circle described by said rotary cutting blade when rotated, and said roller chain is substantially self-supporting along its length such that the roller chain does not contact the cutting blade when the rotary carrier is at rest.

41. The lawn mower of claim 40, wherein said at least one roller chain extends radially from said rotary carrier to substantially the length of said cutting blade.

42. A self-cleaning attachment for a lawn mower including a housing, a motor, an output shaft, and a rotary cutting blade, comprising:
   a rotary carrier powered by said output shaft, said rotary carrier including at least one opening;
   at least one flexible filament mounted for rotation with said rotary carrier, said at least one flexible filament having a bead on one end to retain said at least one filament in said at least one opening;
   wherein said flexible filament is supported at one end by the carrier to extend radially and non-vertically, substantially from a midpoint of a radius of a circle described by said rotary cutting blade when rotated, and said filament is substantially self-supporting along its length such that the filament does not contact the cutting blade when the rotary carrier is at rest.

43. The self-cleaning attachment of claim 42, wherein said flexible filament extends radially from said rotary carrier to substantially the length of said cutting blade and in a substantially parallel plane to said cutting blade.

44. A self-cleaning attachment for a lawn mower including a housing, motor, output shaft, and rotary cutting blade, comprising:
   a rotary carrier powered by said output shaft; and
   a cleaning element secured to said rotary carrier for relative rotation within one inch of said housing;
   wherein said cleaning element is supported at one end by the carrier to extend radially and non-vertically, substantially from a midpoint of a radius of a circle described by said rotary cutting blade when rotated, and said cleaning element is substantially self-supporting along its length such that the cleaning element does not contact the cutting blade when the rotary carrier is at rest.

45. The self-cleaning attachment of claim 44, wherein said cleaning element extends radially from said rotary carrier to substantially the length of said cutting blade and in a substantially parallel plane to said cutting blade.

\* \* \* \* \*